United States Patent [19]

Learn

[11] Patent Number: 4,458,238

[45] Date of Patent: Jul. 3, 1984

[54] HAND HELD DATA ENTRY UNIT

[76] Inventor: Dale H. Learn, Field Ter., Irvington, N.Y. 10533

[21] Appl. No.: 343,441

[22] Filed: Jan. 28, 1982

[51] Int. Cl.³ .............................................. G06F 3/02
[52] U.S. Cl. ............................ 340/365 R; 340/365 S; 340/711; 340/825.19; 400/87
[58] Field of Search .................. 340/711, 712, 365 R, 340/365 VL, 825.19, 825.56, 365 S; 400/87, 88; 178/17 C

[56] References Cited

U.S. PATENT DOCUMENTS

| | | | |
|---|---|---|---|
| 3,651,512 | 3/1972 | Summers | 340/365 VL |
| 4,007,443 | 2/1977 | Bromberg et al. | 340/711 |
| 4,215,240 | 7/1980 | Ostrowski | 340/825.19 |
| 4,241,521 | 12/1980 | Dufresne | 340/825.19 |

FOREIGN PATENT DOCUMENTS

| | | | |
|---|---|---|---|
| 1417848 | 12/1975 | United Kingdom | 400/87 |
| 1475886 | 6/1977 | United Kingdom | 340/712 |

Primary Examiner—Gerald L. Brigance
Attorney, Agent, or Firm—McAulay, Fields, Fisher, Goldstein & Nissen

[57] ABSTRACT

A data entry unit has a board on which a matrix of cells are arranged, for example, twelve columns by four rows. When turned on, each column is sequentially illuminated in a continuous cyclic fashion. The illumination of a column indicates that the data associated with each of the four cells in that column is enabled. A handle attached to the board has at least four switches on it that can be readily manipulated by four fingers of the user's hand. When a column is illuminated, closing one of the four switches will complete the selection of the data in the corresponding one of the four cells of the illuminated column. This data may be stored of displayed or both. Each cell can be designed to correspond to two separate items of data, such as lower and upper case letters. In such a case, a further thumb actuated switch in the handle provides user selection for one of the two data phases of the cell.

12 Claims, 4 Drawing Figures

HAND HELD DATA ENTRY UNIT

BACKGROUND AND PRIOR ART

This invention relates in general to the problem of interfacing a keyboard and an individual using a keyboard and more particularly to a facile manner of enabling an individual without great training or experience to manipulate the input elements of the keyboard in the required sequence to provide information and storage which can be used in any desired fashion.

Keyboards are used in a wide range of equipment from typewriters to word processors to calculators, from large equipment having large readily manipulable keyboards to credit card size pocket calculators having extremely small keyboard elements. Two of the types of problems posed by keyboard design relate to size and complexity. An appreciable number of keys are required on a word processing keyboard including alphabet keys, numerical keys, punctuation keys and instruction or function keys. Proper manipulation of the keyboard requires experience and skill. If the keyboard is to be finger manipulated, as is the typical typewriter, then the size of the keyboard has to be appreciable so that each key is appropriate to the size of a human fingertip. But that spreads out a keyboard considerably, requiring a great deal of motion to input data and instructions and thereby slowing down the input process.

A number of techniques have been employed to solve certain of these problems. Multi-function keys are commonly used. This reduces the number of keys appreciably but usually requires function keys and function sequencing which increases complexity and tends to introduce error.

Some of this background is outlined in a particular solution proposed in U.S. Pat. No. 4,202,038 issued to Stig Petersson on May 6, 1980. Petersson teaches a keyboard having, in one embodiment, eight keys each key having four potential functions. In a second embodiment he has ten keys each performing three potential functions. Each function of each key is a mathematical operation or input number. In any case, the user of the keyboard and associated calculating device actuates the key having the desired operation, function or input thereby initiating a scan sequence through the four functions. Four lights are turned on in sequence, only one light being on at a time. The state of the scan is indicated to the user by which of the four lights is lit. If, for example, the third function in the depressed key is desired, then when the third light becomes lit the user lifts his finger thereby effecting selection of that function, instruction or input. Although this is a useful system, particularly where the total number of functions are limited, to provide a small and convenient keyboard which can be rapidly manipulated, it only partially solves the problem of providing a fast acting, simple to operate, relatively small size keyboard having a substantial number of input items.

U.S. Pat. No. 4,005,388 issued to Richard E. Morley and George G. Schwenk on Jan. 25, 1977 teaches an interactive computer terminal which can be hand-held and provides a twenty-four keyboard with multiple function keys so that a 75-character keyboard is provided. Although this terminal or keyboard provides solutions to certain problems relating to trade-off between size, complexity and speed it does require two hand operation and also requires skill and familarity with the keyboard involved.

It is a major purpose of this invention to provide a further improved information processor that provides an optimum trade-off of keyboard comprehensiveness, simplicity, speed of usage, all in the context of a hand held terminal.

BRIEF DESCRIPTION

In brief, one embodiment of this invention is a hand held data entry unit having a display matrix of twelve columns, four rows deep, thereby providing forty-eight cells. This matrix provides the input letters, numbers and punctuation marks desired but is not deemed a keyboard herein because the user does not manipulate or manually actuate these cells. However, each cell corresponds to a key of the keyboard. This display panel is mounted on a handle which is held by the user. The handle has four selection keys, each corresponding to one of the four rows of the display panel. These selection keys are manipulated by the four fingers of the user's hand.

A fifth and sixth key is provided and can be manipulated by the user's thumb to perform certain space and shift function.

Separate light bulbs are positioned behind each of the twelve columns of the forty-eight cell matrix. These twelve columns are lit in sequence from left to right, only one being lit at a time so that one, and only one, column of the twelve columns is lit at a time. The matrix is translucent so that the light shows through and each row of the matrix is sparately colored; for example, row one is red, row two is yellow, row three is green and row four is blue.

When the terminal is turned on, the lights are sequenced, at a rate that can be determined by the user, to scan across the matrix column by column. When a desired character is lit, the user actuates the key on the handle associated with the row in which the desired character is positioned thereby selecting that character and causing it to be inputted into a memory unit contained in the terminal. The matrix or field can be scanned as fast as four times a second, depending on the individual. In this fashion an optimum combination of visual and manipulation coordination is employed in order to provide a simple, rapid and readily hand held terminal.

Thumb actuation of a space key on the handle will introduce a space immediately after the last character selected. Certain of the cells of the matrix can perform dual functions and a shift key on the handle is thumb actuated by the user to select the second function. For example, if the two functions are to lower case and upper case letters, actuation of the shift key simultaneously with the character being selected will generate the upper case character.

Function selection buttons which have to be separately manually actuated, can be included on the display panel in order to permit selection of functions such as a paragraph indication, backspacing and erasing. The frequency of use of these functions is sufficiently low so that separate manipulation is feasible and acceptable.

A microprocessor is incorporated in the terminal which processes the selected character and places them on both an eight kilobit (one page) memory chip and on a microcassette tape that is removable. The tape is the main memory unit. It can be removed and the information then fed to whatever other processing equipment is available such as an automatic typewriter so that hard copy can be produced.

A twenty character display line displays the data being selected.

DESCRIPTION OF THE PREFERRED EMBODIMENTS

Figure 1:
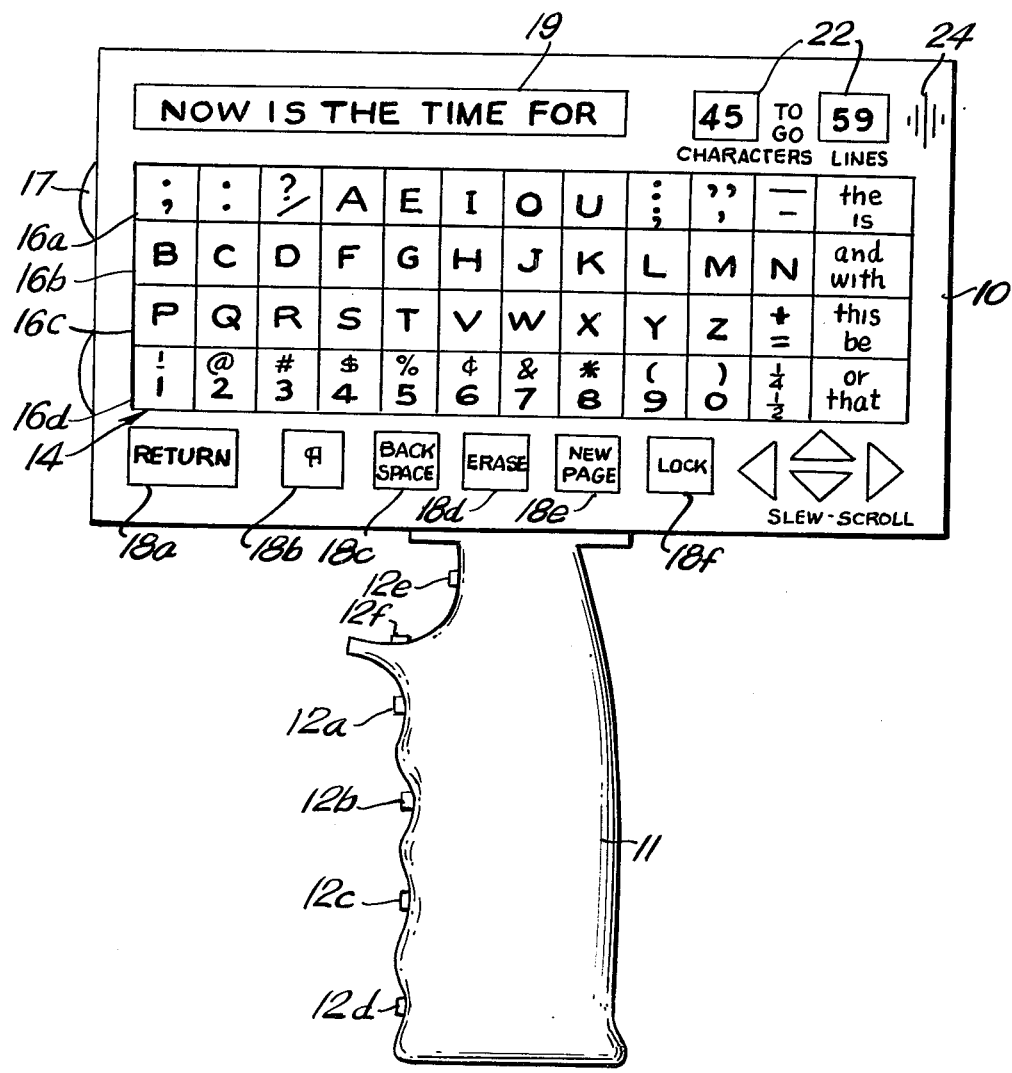
FIG. 1 is a plan view of the terminal of this invention illustrating a typical matrix and including function keys and a display line.

The various FIGS. illustrate one embodiment of the invention. However, FIG. 1 substantially shows the key concepts and relationships. As shown in FIG. 1, there is a display panel 10 which is attached to a handle 11 adapted to be held by an individual. On this handle 11 there are six switches 12, which are positioned to be finger actuated, in particular, switches 12a, 12b, 12c and 12d are deployed for convenient manipulation respectively by the index finger, middle finger, ring finger and little finger. The two switches 12e and 12f are deployed for manipulation by the thumb. The display panel 10 and handle 11 together constitute the hand held data entry unit of this invention.

The main display feature on the panel 10 is the matrix of twelve columns arranged in four rows. The rows 16 are respectively indicated as row 16a, 16b, 16c and 16d and these rows correspond respectively to the switches 12a through 12d. It is preferble that these four rows be color-coded, such as red, yellow, green and blue, respectively to correspond to color-coded switches 12a through 12d respectively.

When the device is ready to be used, it is turned on by a switch 17 (also shown in FIG. 3) which initiates proper enabling and reset functions as described in connection with FIG. 3 and causes the columns of the matrix 14 to light up one at a time in sequence. Neon light bulbs 74 positioned behind a translucent strip on the face of each of the columns of the matrix 14 permits light to show through and is preferably color coded as indicated above so that the first row shows through red, the second yellow, the third green and the fourth blue. As the light scans across the matrix, column by column, the user waits until the desired character is lit and then presses the appropriate button to enter that character into memory. For example, if the user pushes to enter the letter H, then when the sixth column is lit, the user presses the switch 16b and the appropriate entry is made into memory. a field scan of about four times a second is considered to be appropriate for most uses, but the clock (shown in FIG. 4) which controls this scan rate may include a variable control so that the optimum scan rate for the user can be selected.

When there is the desire to initiate a space right after a selected letter, the user actuates the switch 12e and such is put into memory.

Certain of the cells in the matrix 14, particularly in first row of 16a and the fourth row of 16d are indicators performing a dual function. When the user wishes to select the upper function shown, the user must simultaneously actuate the shift button 12f as well as the appropriate one of the selection buttons 12a or 12d.

There are a number of other selection buttons, 18a through 18f shown on the display panel 10. These function selection buttons have to be manually actuated, normally with the users other hand, to provide the function indicated. These buttons are used relatively infrequently so that separate manipulation is acceptable without imposing substantial burden or complexity on this as a hand-held data entry unit.

A twenty-character display 19 displays the last twenty characters selected and thus is a useful means for keeping the user informed as to what has just been selected and thus aids in maintaining continuity. The two numeric displays 22 and 23 indicate how many characters are left in a line and how many lines are remaining on the page so that the user can appropriately plan the layout when using the device in a portable mode. A small audio beeper mechanism 24 can be used to indicate end of line and end of page notations so as to facilitate input editing by the user. The same audio beeper, emitting a different tone, will signal the user when the main memory unit is filled.

The hand held unit can also be connected to an ordinary television set through an RF connecting cable to provide the user with a full display of the information keyed into the unit.

Figure 2:
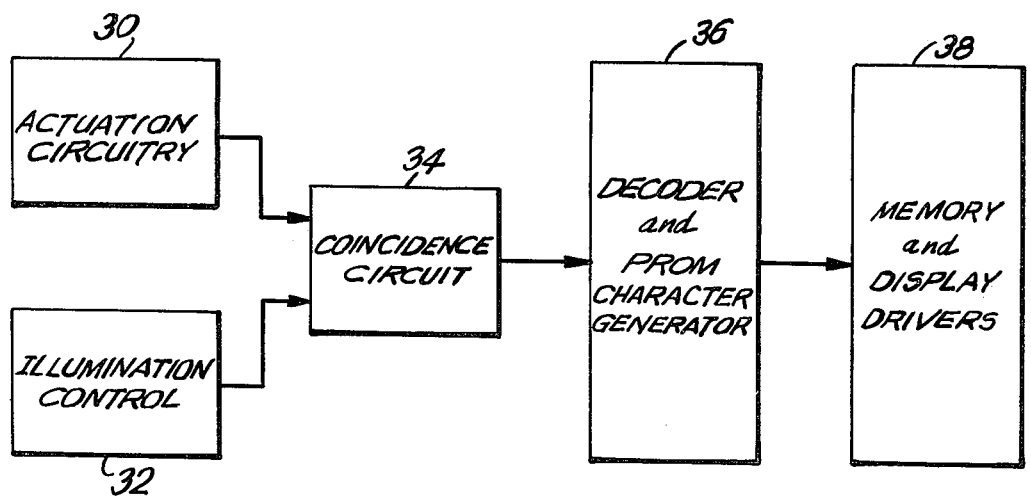
FIG. 2 is a highly simplified block diagram illustrating the electronic circuitry employed in the FIG. 1 device.

FIG. 2 is provided simply to show the broad logic of the electronic arrangement employed in the FIG. 1 device. The actuation circuit 30 is responsive to the various manually actuable button switches 12 to provide an appropriate output signal. As discussed in greater detail in connection with FIG. 3, this actuation circuit 30 provides a de-bouncing and anti-tease mechanism together with appropriate delays in order to provide an unambigious signal corresponding to the button switch 12 being selected.

Figure 4:
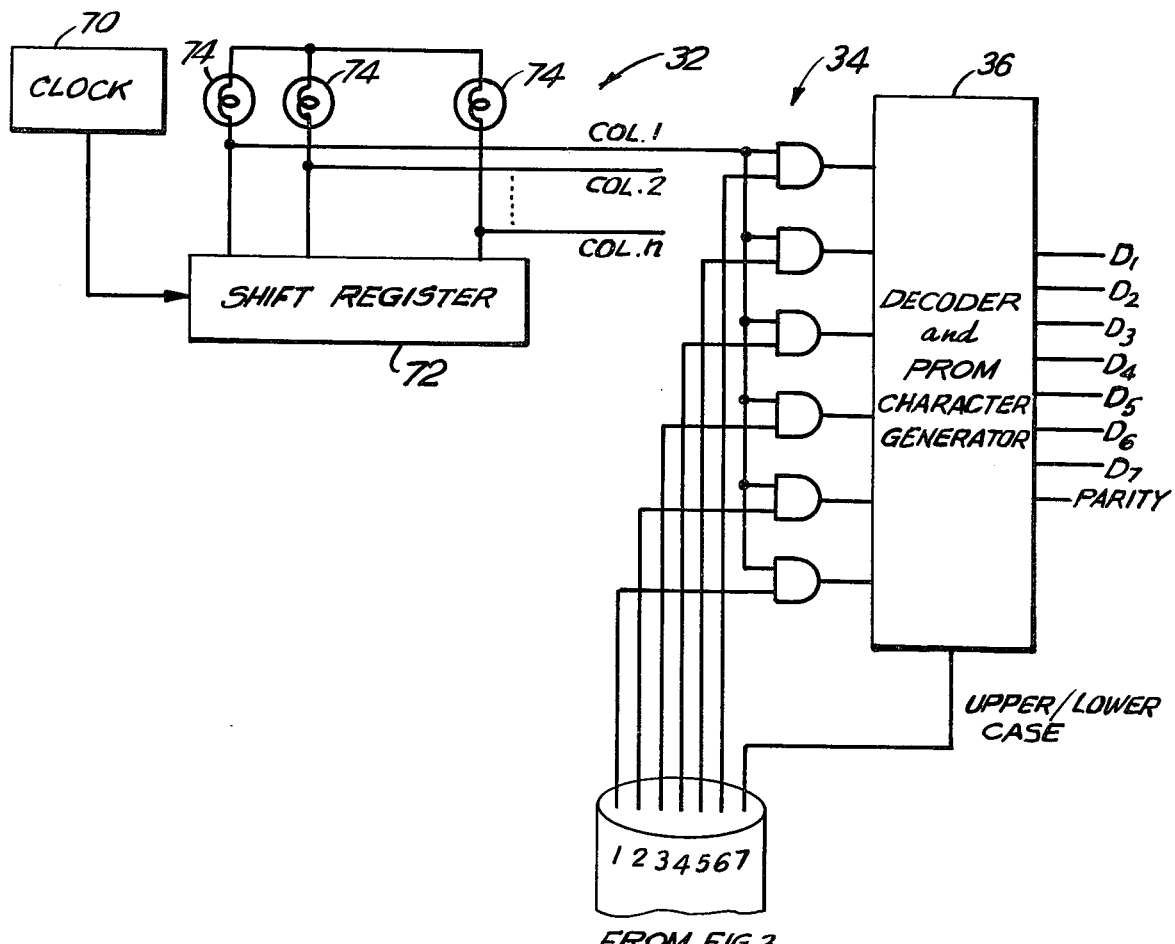
FIG. 4 is a block and schematic diagram illustrating the other main components of the FIG. 2 system.

The illumination control and illumination circuit 52 provides the automatic sequential illumination of the columns of the display matrix and, as shown in FIG. 4, is run under the control of an adjustable clock so that the speed of operation of the device can be varied and adapted to the individual using the device. The output signals from these two blocks 30, 32 are fed to coincident circuit 34 to provide the appropriate control input to the decoder and character generation circuit 36. The appropriate output signals from the decoder 36 are applied to a shift register memory and display driver circuit 38.

Although the actuation circuit 38 has been specially designed and adapted to the requirements for this hand held data entry unit, the rest of the circuit is substantially standard circuitry which are either off the shelf items of a known sort or readily adapted by one skilled in the art from off the shelf items. Accordingly, the rest of the detailed description herein will primarily be directed to the actuation circuit 30 which is shown in somewhat greater detail in FIG. 3. The rest of the circuitry will be described in only sufficient detail to facilitate comprehension of the overall unit and how and why it operates as it does.

Figure 3:
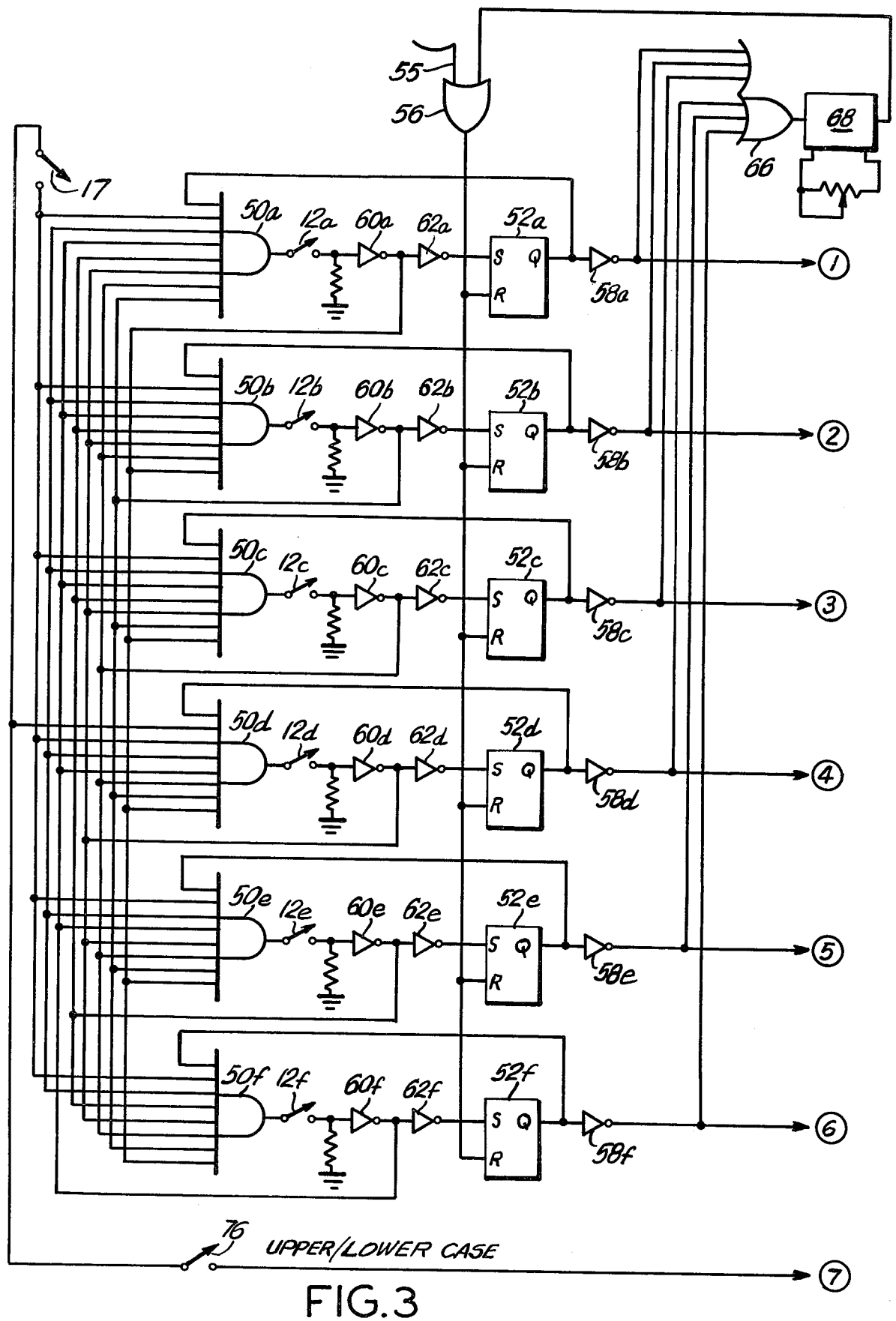
FIG. 3 is a more detailed block and schematic diagram of the actuation circuit component of the FIG. 2 system.

As shown in FIG. 3, a series of AND gates 50 and latches 52 are provided, one for each of the switches 12 on the handle 11. In the unenergized state shown in FIG. 3, with all switches 12 open the following situation exists. Because the enable switch 17 is open, each of the AND gates 50 has a low output. It should be noted that an AND gate 50 provides a high output only when all eight inputs to that AND gate are high. The output from the latches 52 may be indeterminate. However, as soon as the device is turned on a master reset signal 55 is applied through OR gate 56 to set each of the latches 52 to its high output state. With the output from each latch 52 high, one high input is established at each AND gate 50. The closing of the enable switch 17 establishes a second high input at each AND gate 50. Because each of the manual switches 12 is open, the input at each inverter 60 is low so that the output from that inverter 60 is high. Since the output of each of the inverters 60 is applied as an input to each of the other six AND gates 50, each AND gate 50 will have all eight of its inputs high after the unit is turned on and the switch 17 closed so that the outputs of each AND gate 50 will also be high.

Accordingly, it can now be seen, with reference to one of the switches, that the closing of switch 12a will provide a high input to the inverter 60a thereby causing the output from that inverter 60a to go low thereby inhibiting each of the other AND gates 50b through 50f. The inverter 62a will go high applying a set signal to the latch 52a causing the latch output Q to go low thereby inhibiting and turning off the AND gate 50a. At the same time, the inverter 58a goes high thereby providing an output signal which indicates the user's selection of the top rows (Row A). The application of the high output from the inverter 58a through the OR gate 66 to a variable time delay 68 results in an output from the time delay, after a preselected delay of perhaps one-half second of less, to reset the latch 52a.

This time delay 68 is selected to be long enough so that any bounce in the switch 12a or any manual teasing of the switch 12a will not result in multiple signal outputs from the line 59a. At the same time, this time delay is selected to be short enough (generally well under one half a second) so that if the user wishes to select a double letter, that can be done by keeping one's finger on the switch, 12a for example, and a double output will be applied on the line 59a during the time that the column remains illuminated and enabled. Accordingly, the time delay 68 has to be less than the time during which any column is illuminated but great enough to compensate for switch bounce and finger teasing.

The circuity shown in FIG. 4 and the rest of the circuity shown in FIG. 3 is sufficiently routine so that detailed description is not necessary. Essentially, a clock 70 through a shift register 72 controls the sequential illumination of the twelve lamps 74 positioned respectively at each of the twelve columns of the matrix 14. The outputs, indicated as 1 through 7, from the actuation circuit 30 shown in FIG. 3 are applied, together with the appropriate signal indicating which of the twelve columns are illuminated, to a series of AND gates which comprise the coincident circuit 34 to provide appropriate inputs to the decoder and character generator 36. For simplicity most of the connections from the lamps 74 to the coincident circuity 34 are omitted. One skilled in the art could readily make the appropriate interconnections. The generator 36 is a known type of generator in this art and will provide the selected data to be stored in memory and/or displayed. A separate switch 76 (shown in FIG. 3) can be actuated by the user to provide an input signal directly to the generator 36 to select either upper or lower case characters as desired.

Although a preferred embodiment has been described, there are certain variations from this embodiment which would still be within the scope of this invention.

For example, the column that is being enabled is also illuminated to provide a visual representation to the user as to which column is enabled. This visual sensory signal is the presently preferred mode of communicating the enabling of a column to the user. However, each column could have a distinct auditory tone which is emitted coincident with the enabling of the column to provide a sensory signal to the user. There are circumstances in which such might be preferred by one who is visually impaired or, perhaps more commonly, by one who has sufficient facility with this data entry unit that he or she is able to operate it without directly looking at it much in the fasion that a skilled typist can perform touch typing. Indeed, an auditory signal might be used to supplement the visual signal so that a skilled user of this data entry unit can enter data from a printed page which he is simultaneously reading. An auditory signal would require a different tone as each one of the M columns is enabled.

What I claim is:

1. A data entry unit comprising:
   a matrix of cells arranged in M columns and N rows, each of said cells being adapted to correspond to an item of data,
   means to sequentially illuminate each of said M columns in a continuous cyclic fashion,
   a manually actuable set of at least N switches, each of said N switches serving to actuate one of N selection circuits that is coupled to a separate one of said N rows,
   enabling means correlated to said illumination of one of said M columns and to the manual actuation of one of said N switches to select the data represented by the one of said cells determined by said illuminated column and said manually selected row, and
   memory means for retaining said selected data.

2. The data entry unit of claim 1 further comprising:
   a display panel, said matrix being positioned on said display panel,
   a handle attached to and supporting said display panel, said switches being located on said handle and positioned for actuation by respective ones of the fingers of the hand of a user.

3. The data entry unit of claim 2 wherein:
   N is four, each one of said four switches corresponding to one each of said four rows and each of said four switches being positioned along said handle parallel to the axis of the handle for respective actuation by the index, middle, ring and little finger of the user.

4. The data entry unit of claims 1 or 2, wherein:
   at least some of said cells of said matrix being adapted to correspond to two separate items of data, such cells having a first phase in which a first one of said items of data is selected and a second phase in which a second one of said items of data is selected, and
   selection switch means to enable said second phase of said cells.

5. The data entry unit of claims 1 or 2 further comprising:
   space switch means, actuation of which provide a space data.

6. The data entry unit of claim 2, wherein:
said handle is detachable from said display panel and, when detached, said memory means is adapted to be coupled to a permanent memory record.

7. The data entry unit of claims 1 or 2 further comprising:
repeat means responsive to the holding down of one of said N switches for substantially the duration of the illumination of one of said columns to provide a duplicate entry of the data so selected into said memory means.

8. A data entry unit comprising:
a matrix of cells arranged in M columns and N rows, each of said cells being adapted to correspond to an item of data,
first means to sequentially enable each of said M columns in a continuous cyclic fashion and to provide a sensory signal indicating which of said M columns is enabled,
a manually actuable set of at least N switches, each of said N switches when actuated serving to enable a separate one of N selection circuits that is coupled to a separate one of said N rows,
coincident means responsive to the enabling of one of said M columns and to the manual actuation of one of said N switches to select the data represented by the one of said cells determined by said enabled column and said manually selected row, and memory means for retaining said selected data.

9. The unit of claim 8 wherein said sensory signal provided by said first means is illumination of the enabled column.

10. The unit of claim 8 wherein said sensory signal provided by said first means is an auditory tone unique to the column being enabled.

11. The data entry unit of claim 8 further comprising:
a display panel, said matrix being positioned on said display panel,
a handle attached to and supporting said display panel, said switches being located on said handle and positioned for actuation by respective ones of the fingers of the hand of a user.

12. The data entry unit of claim 11 wherein:
N is four, one each of said four switches corresponding to one each of said four rows and each of said four switches being positioned along said handle parallel to the axis of the handle for respective actuation by the index, ring and little finger of the user.

* * * * *